W. H. DOUGLAS.
CONVERTIBLE AUTOMOBILE BODY.
APPLICATION FILED FEB. 26, 1918.

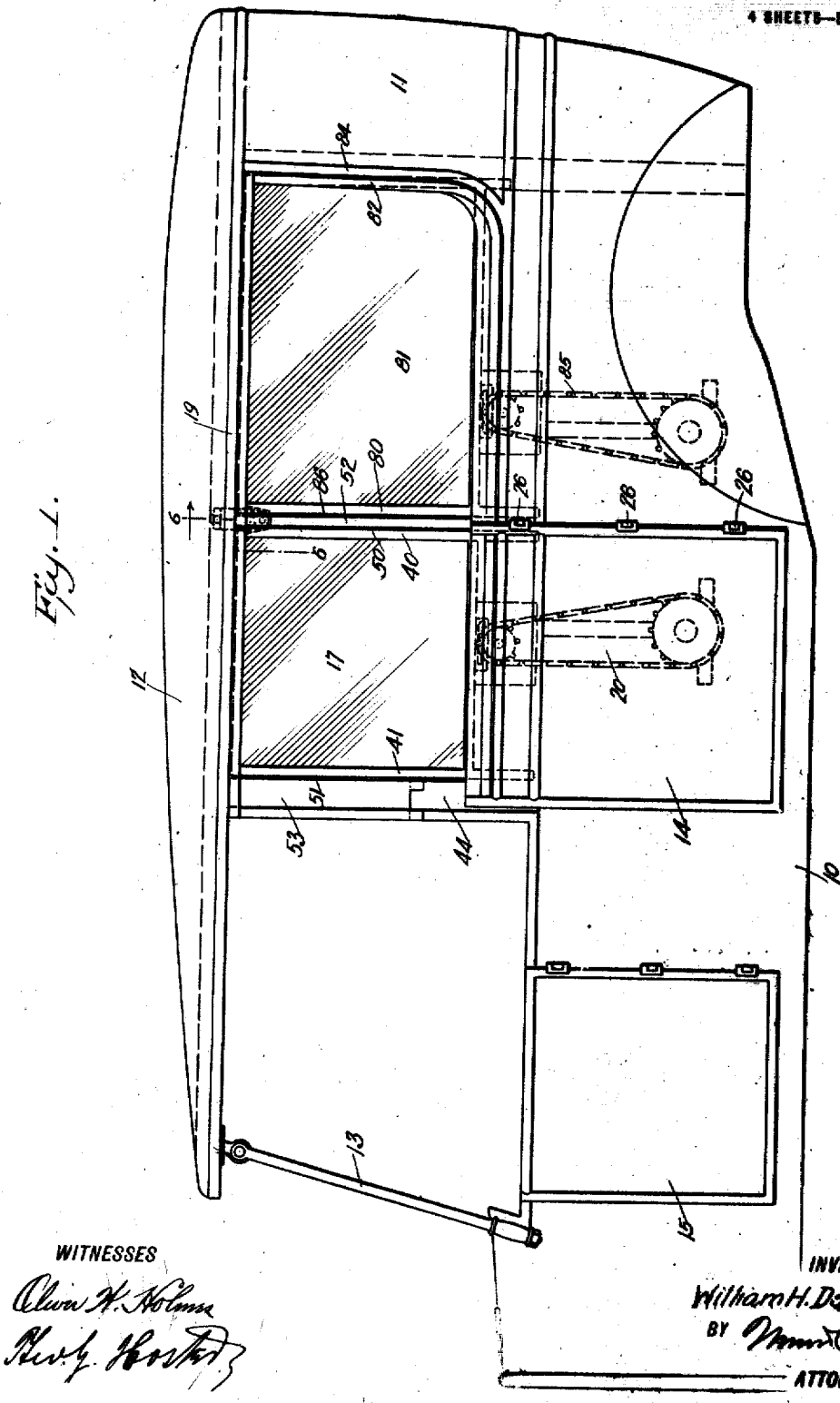

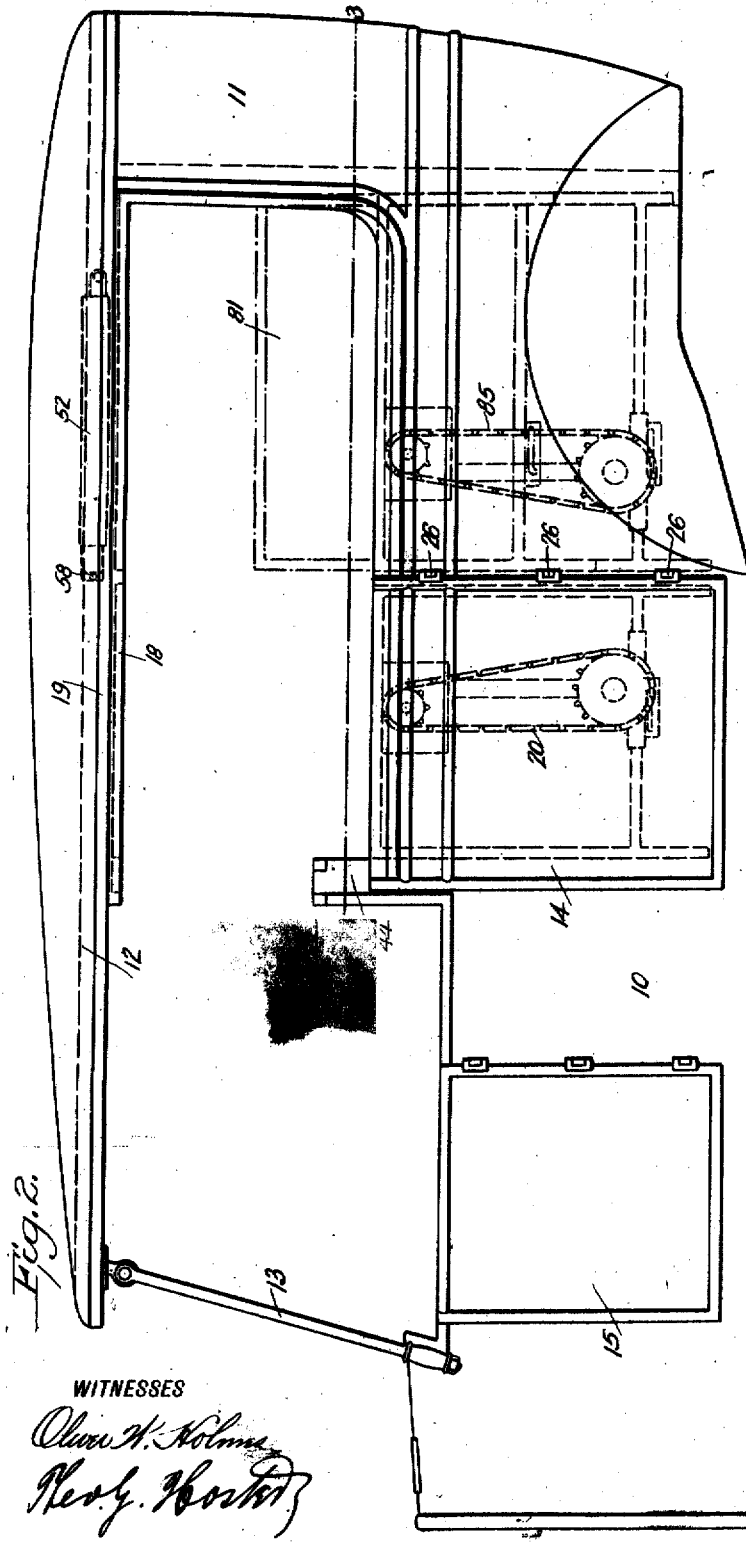

1,318,983.

Patented Oct. 14, 1919.
4 SHEETS—SHEET 3.

WITNESSES

INVENTOR
William H. Douglas
BY
ATTORNEYS

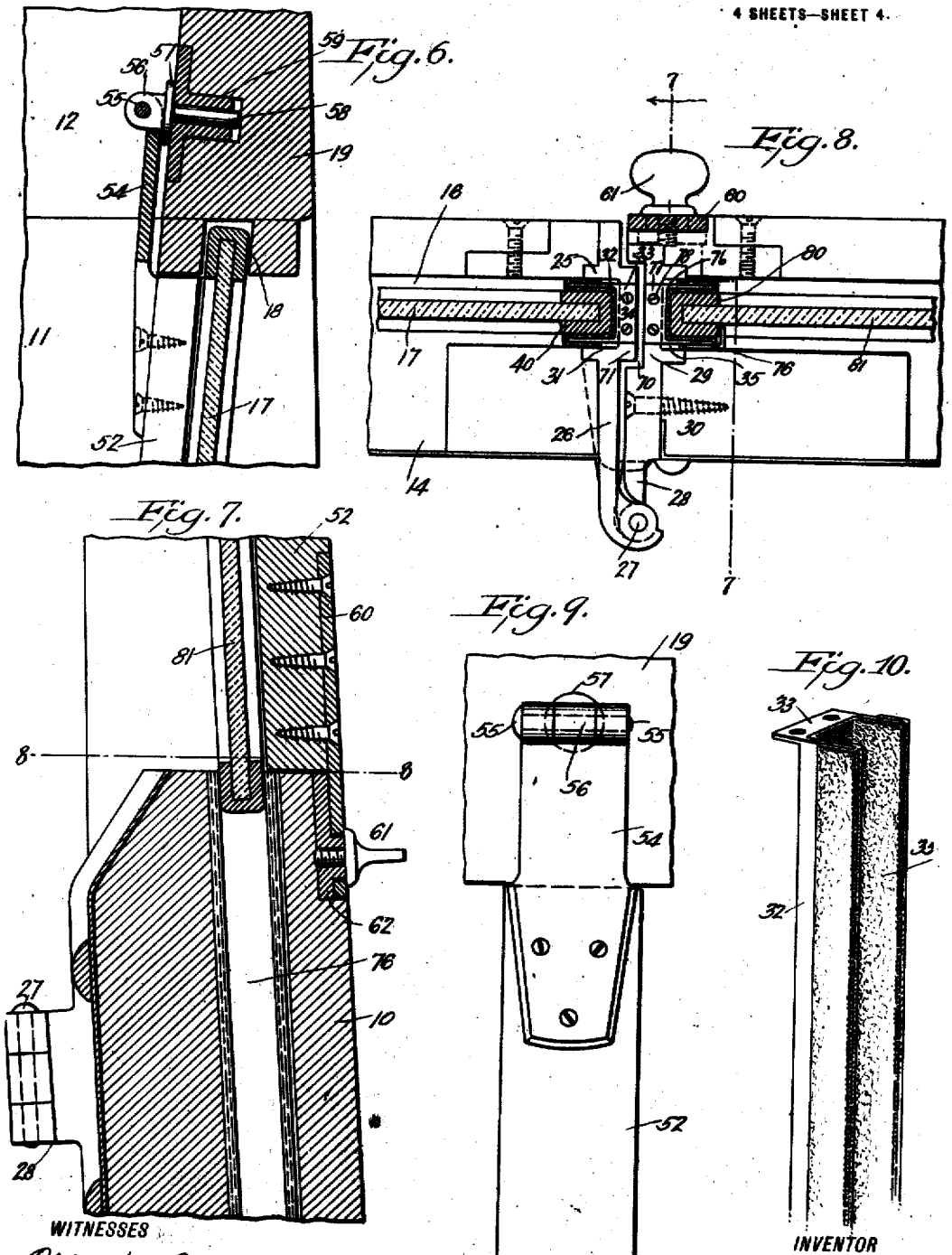

UNITED STATES PATENT OFFICE.

WILLIAM H. DOUGLAS, OF BELLEVILLE, NEW JERSEY.

CONVERTIBLE AUTOMOBILE-BODY.

1,318,983.  Specification of Letters Patent.   Patented Oct. 14, 1919.

Application filed February 26, 1918. Serial No. 219,235.

*To all whom it may concern:*

Be it known that I, WILLIAM H. DOUGLAS, a citizen of the United States, and a resident of Belleville, in the county of Essex and State of New Jersey, have invented a new and Improved Convertible Automobile-Body, of which the following is a full, clear, and exact description.

The invention relates to automobile bodies having a permanent top, and its object is to provide a new and improved convertible automobile body arranged to permit of conveniently converting the body from a closed one to an open one or vice versa. Another object is to increase the inside width of the automobile body without increasing the outside width thereof thus providing more space in the body than is now had in automobile bodies of this type. Another object is to permit of conveniently taking out the rear windows, whenever it is desired to do so.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the convertible automobile body with the parts in position to provide a closed automobile body;

Fig. 2 is a similar view of the same with the parts in position to provide an open automobile body;

Fig. 3 is an enlarged sectional plan view of the same on the line 3—3 of Fig. 2;

Fig. 6 is an enlarged cross section of part of the convertible automobile body on the line 6—6 of Fig. 1;

Fig. 7 is a similar view of another portion of the convertible automobile body, the section being on the line 7—7 of Fig. 8;

Fig. 8 is a sectional plan view of the same on the line 8—8 of Fig. 7;

Fig. 9 is an enlarged side elevation of one of the upper pillar sections; and

Fig. 10 is a perspective view of one of the guideways for a door window or a rear window to slide in.

Figure 4:
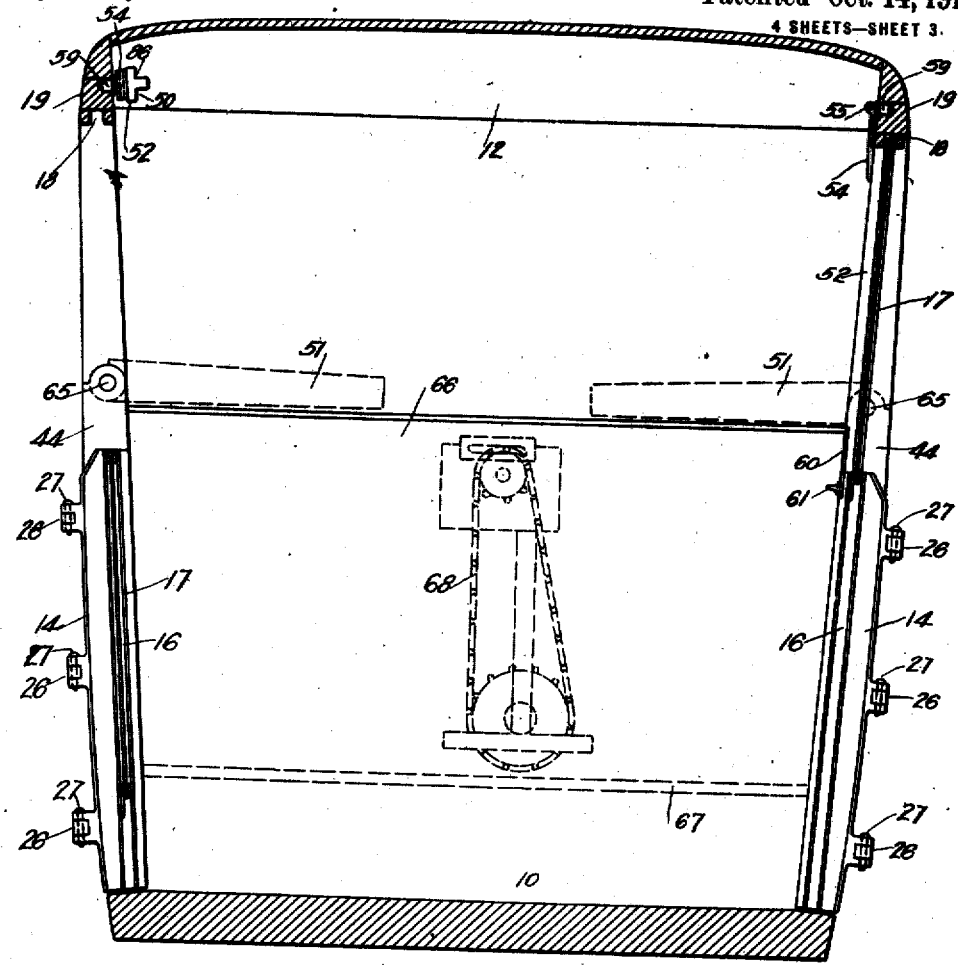
Fig. 4 is an enlarged cross section of the convertible automobile body with the window in the door at one side raised and the window in the door at the other side lowered.
Figure 5:
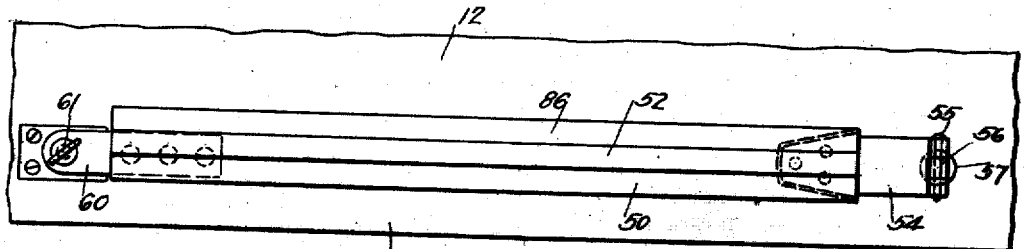
Fig. 5 is an enlarged side elevation of one of the upper pillar sections in folded position in the permanent top of the automobile body.

The automobile body 10 is provided with the usual raised back 11 supporting the rear end of a permanent top 12 supported at the front by links 13 from the front end of the body 10. Each side of the body 10 is provided with a main door 14 and a front door 15, of which the main door 14 is provided with a pocket 16 for the reception of a window 17 which when raised to its full height extends at its upper end into a retaining groove 18 formed on the under side of the corresponding side rail 19 of the top 12 (see Figs. 4 and 6). Raising and lowering mechanism 20 of any approved construction is mounted on the main door 14 and is connected with the window 17 to raise or lower the latter to suit the convenience of the occupant of the automobile body. As the special construction of this raising and lowering device 20 forms no part of this invention further detailed description of the same is not deemed necessary.

The right-hand side of each main door 14 is provided with a door stile 25 (see Fig. 8) made of channel iron and having outwardly extending hinge members 26 connected by pintles 27 with hinge members 28 formed on a pillar or post 29, likewise made of channel iron, and attached by screws or other fastening means 30 to the body 10, as plainly shown in Fig. 8. Into the channel 31 of the door stile 25 fits a metal guideway 32 provided at the top and bottom with sidewise extending flanges 33 fastened by screws 34 to the top and bottom of the door stile 25. The guideway 32 is provided with a lining 35 of felt, cloth or other suitable material, and covering the back as well as the sides on both the inner and outer faces, as plainly indicated in Figs. 8 and 10. In this guideway 32 is fitted to slide up and down the metallic right-hand stile 40 of the window 17, which has its left-hand stile 41 mounted to slide in a similar guideway 42 attached to the left-hand door stile 43 of the door 14, as shown in Fig. 3. The door stile 43 fits onto the right-hand side of the forward door pillar or post 44 secured to the automobile body and extending a short distance above the top of the door, as plainly indicated in Figs. 1 and 2. By the use of the lining 35 in each of the guideways 32 and 42 all undesirable rattling of the window 17 is prevented, and by extending the lining 35 to the outer faces of the sides of the guideway 32, a snug fit of the latter is had in the channel 31 of the door stile 25.

The window stiles 40 and 41 when moving the window 17 up or down engage guideways 50 and 51 formed on the upper pillars or posts 52 and 53, of which the pillar 52 forms an extension of the pillar 29 and is made T-shaped in cross section, as plainly indicated in the left upper corner of Fig. 4. The upper end of the pillar 52 extends normally under the top rail 19 and is provided with an upwardly extending arm 54 connected with a pivot 55 mounted on a lug 56 projecting centrally from a flange 57 provided with a pivot 58 disposed at a right angle to the pivot 55 (see Fig. 6). The pivot 58 is mounted to turn in a bearing 59 attached to the inner face of the top rail 19. By the arrangement described, the pillar 52 can be swung inward by turning on the pivot 55 and then swung upward to fold against the inner face of the rail 19, it being understood that during the upward swinging movement the pivot 58 turns in its bearing 59. The lower end of the upper pillar 52 is provided with a flange 60 fitting into a recess plate 62 attached to the body 10 adjacent the inner side of the pillar 29, and this flange is fastened by a screw 61 in position on the body thus practically providing a continuous guideway for the stile 40 of the window 17 in the pillars 29 and 52. The front pillar 51 is pivoted at 65 to the upper end of the fixed pillar 44 to permit of swinging the said pillar 51 transversely in a downward direction and onto the top of the usual transverse back 66 of the front seat (see dotted lines in Fig. 4). It is understood that the back 66 is provided with the usual window 67 adapted to be raised or lowered by a raising or lowering device 68 similar to the devices 20 previously mentioned, but the pillars 51 are swung downward onto the top of the back 66 only at the time this window 67 is in lowered position. From the foregoing it will be seen that when it is desired to use the automobile body as a closed one then the pillars 52 and 53 are in active vertical positions to provide guideways for the raised window 17. When the body is to be converted into an open body then the screw 61 is removed from the plate 62 to allow of swinging the pillar 52 into folded position against the side of the rail 19 while the other pillar 51 is swung transversely downward onto the top of the back 66 of the front seat.

The channel 70 formed in the left-hand side of the fixed pillar 29 is adapted to be engaged by a corresponding projection 71 formed on the door stile 25 to insure a tight joint thus securely holding the door in position when closed. The right hand side of the pillar 29 has a channel 75 into which extends a guideway 76 similar to the guideway 32 and likewise provided at the top and bottom with flanges 77 fastened by screws 78 to the top and bottom of the pillar 29. In this guideway 76 is mounted to slide up and down the left-hand stile 80 of a rear window 81 having its right-hand stile 82 mounted to slide up and down in a similar guideway 83 attached to the pillar 84 extending the entire height of the body from the bottom thereof to the top rail 19. The window 81 is adapted to be raised or lowered by a suitable raising or lowering device 85 similar to the devices 20, so that further description of the same is not deemed necessary. The left-hand window stile 80 when moving into uppermost position is guided on a guideway 86 formed on the right-hand side of the upper pillar 52 previously mentioned so that the latter serves as a guideway for the stile 40 of the window 17 as well as the guideway for the stile 80 of the rear window 81. It will be noticed that when the upper pillars 52 and 53 are in folded position and the automobile body is thus converted into an open one, it is still permissible for the occupants to raise the windows 17 and 81 a desired distance above the belt of the body, as indicated, for instance, in dotted lines in Fig. 2, which shows the rear window 81 partly raised. It will further be noticed that by the arrangement described the driver of the automobile can quickly and conveniently convert the automobile body from an open one to a closed one or vice versa.

Having thus described my invention, I claim as new and desire to secure by Letters Patent:—

1. In an automobile body, a door, a door pillar on which the said door is mounted to swing, the said pillar having a rabbet in the side adjacent the door and the said door having stiles, of which one is provided at the outer side with a tongue adapted to engage the said rabbet at the time the door is closed, guideways attached to the said door and extending along the inner sides of the stiles, and a door window having a frame slidably engaging the said guideways.

2. In an automobile body, a door having stiles, of which one is formed of channel iron and is provided with integral hinge members, guideways attached to the inner sides of the said door stiles, a window slidable in the said guideways, and a door pillar formed of channel iron and provided with integral hinge members and pintles connecting the said hinge members of the door and pillar with each other.

3. In a convertible automobile body having a fixed top, front and rear door pillars, each formed of sections, the upper section of the front pillar being hinged to the lower section to fold transversely and the upper section of the rear pillar being hinged to the top to fold lengthwise under the same, the lower section of the rear pillar having a longitudinal channel, a door hinged to the lower rear pillar section, and a sash mounted to slide up and down in the door, the rear stile of the door being provided with a projection engaging the channel of the rear pillar section.

WILLIAM H. DOUGLAS.